United States Patent
Schaefer et al.

(10) Patent No.: US 7,089,821 B2
(45) Date of Patent: Aug. 15, 2006

(54) SHIFT DEVICE FOR MANUAL FIELD TRANSMISSION

(75) Inventors: Andreas Schaefer, Abstatt (DE); Martin Poeschl, Gundelsheim (DE); Martin Burgbacher, Villingen-Schwenningen (DE)

(73) Assignee: Getrag Getriebe- und Zahnradfabrik Hermann Hagenmeyer GmbH & Cie KG, Untergruppenbach (DE)

( * ) Notice: Subject to any disclaimer, the term of this patent is extended or adjusted under 35 U.S.C. 154(b) by 0 days.

(21) Appl. No.: 10/837,523

(22) Filed: Apr. 30, 2004

(65) Prior Publication Data

US 2004/0255708 A1 Dec. 23, 2004

Related U.S. Application Data

(63) Continuation of application No. PCT/EP02/11876, filed on Oct. 24, 2002.

(30) Foreign Application Priority Data

Oct. 31, 2001 (DE) ................. 101 53 634

(51) Int. Cl.
*F16H 59/00* (2006.01)
*G05G 5/08* (2006.01)

(52) U.S. Cl. .................. 74/337.5; 74/335; 74/473.25; 74/475.26

(58) Field of Classification Search .......... 74/335, 74/37.5, 473.21, 473.24–6
See application file for complete search history.

(56) References Cited

U.S. PATENT DOCUMENTS

| | | | |
|---|---|---|---|
| 3,513,717 A | | 5/1970 | Lickey et al. |
| 3,572,187 A | | 3/1971 | Bosko et al. |
| 4,666,023 A | * | 5/1987 | Achberger et al. ........ 74/473.21 |
| 5,593,358 A | | 1/1997 | Frost |
| 5,743,147 A | * | 4/1998 | Gazyakan ................. 74/473.25 |
| 6,026,702 A | * | 2/2000 | Dreier et al. ............. 74/473.26 |

FOREIGN PATENT DOCUMENTS

DE 29 35 590 4/1983

(Continued)

OTHER PUBLICATIONS

Miscellaneous communication from the International Bureau regarding PCT/EP2002/011876.

*Primary Examiner*—Roger Pang
(74) *Attorney, Agent, or Firm*—Knobbe, Martens, Olson & Bear LLP (57) ABSTRACT

A shift device for an inline transmission, comprising a shift shaft which is rotated during selection movements and is offset axially during shift movements, a plurality of shift members each of which being mounted movable or pivotably in the axial direction, for the actuation of at least one assigned shift clutch, a plurality of shift fingers which are secured to the shift shaft and extend in each case towards one side, each shift finger being assigned to one of the shift members and being arranged in such a way that, in a defined rotary selection position of the shift shaft, the shift finger is coupled axially to its assigned shift member, in order to drive the shift member during an axial movement of the shift shaft, and a blocking device for preventing two or more gears of the transmission from being shifted simultaneously, the blocking device having a plurality of individual blocking elements mounted fixedly with respect to the casing.

Further, the blocking elements each act between an assigned shift member and a blocking member connected fixedly to the shift shaft.

14 Claims, 3 Drawing Sheets

FOREIGN PATENT DOCUMENTS

| | | |
|---|---|---|
| DE | 37 30 230 | 3/1989 |
| DE | 43 42 957 | 6/1995 |
| DE | 199 01 056 | 8/1999 |
| DE | 199 51 683 | 5/2001 |

* cited by examiner

SHIFT DEVICE FOR MANUAL FIELD TRANSMISSION

RELATED APPLICATIONS

This application is a continuation of International Application No. PCT/EP02/11876 filed Oct. 24, 2002 and claims the benefit of German Application No. DE 101 53 634.8 filed Oct. 31, 2001, both of which are incorporated by reference in their entirety herewith.

BACKGROUND OF THE INVENTION

1. Field of the Invention

The present invention relates to a shift device for an inline transmission, with:
- a shift shaft which is rotated during selection movements and is offset axially during shift movements;
- a plurality of shift members which each are mounted movably or pivotably in the axial direction, for the actuation at least one assigned shift clutch;
- a plurality of shift fingers which are secured to the shift shaft and each extend towards one side, each shift finger being assigned to one of the shift members and being arranged in such a way that, in a defined rotary selection position of the shift shaft, the shift finger is coupled axially to its assigned shift member, in order to drive the shift member during an axial movement of the shift shaft; and
- a blocking device for preventing two or more gears of the transmission from being shifted simultaneously, the blocking device having a plurality of individual blocking elements mounted fixedly with respect to the casing.

2. Description of the Related Art

A shift device of this type is known from DE 43 42 957 A1.

The invention relates, in general terms, to a shift device for the actuation a manual shift transmission of the in-line form of construction. (including in-line transaxle), with a device for preventing a situation where a plurality of gears can be shifted simultaneously, and with latching for the individual shift rockers/forks.

In the field of shift devices for transmissions, in particular of transmission for motor vehicles, the individual shift members (shift forks or shift rockers) are often actuated by means of a plurality of shift rods. This is known, for example, from DE 29 35 590 C2.

It is known, as a blocking device for the plurality of shift rods, to move a blocking slide transversely to the extent of the shift rods (DE 37 30 230 C1).

DE 199 51 683 A1 discloses a shift device for a motor vehicle transmission, in which a central shift shaft has provided on it a plurality of shift fingers which can be positively coupled axially to respective shift members.

A blocking plate which is arranged parallel to the shift shaft and overall is mounted so as to be displaceable in a direction transverse to the shift shaft, serves as a blocking device. For this purpose, the blocking plate is connected to a coupling lever which is secured fixedly in terms of rotation to the shift shaft. The shift members have provided on them respective blocking elements which, in a blocking position, engage into respective grooves of the blocking plate. When a shift member is selected as a result of the rotational movement of the shift shaft, the blocking plate releases the blocking element of the shift member, so that the shift member can be displaced axially or pivoted. In that rotary position of the shift shaft, the blocking elements of the other shift members each engage into an assigned groove of the blocking plate and are consequently fixed axially, so that shifting-in the assigned gears is prevented.

Disadvantages of this prior art are the complicated coupling between shift shaft and blocking plate and the complicated mounting of the blocking plate.

Two embodiments of blocking devices are known from DE 43 42 957 A1 mentioned in the introduction.

In one embodiment of this prior art, individual blocking elements in the form of blocking beans are mounted on the shift members. In a blocking state, the blocking members are pressed into recesses in the transmission casing, counter to spring prestress, by means of respective coupling members on the shift shaft. Insofar as one shift member is selected, the assigned coupling member is brought into a rotary position such that the blocking element can penetrate into a recess of the coupling member by means of the spring prestress, in order thereby to release the positive coupling between transmission casing and shift member.

In a second embodiment of this prior art, a plurality of individual blocking elements are mounted on the transmission casing and are prestressed elastically in a direction towards the shift shaft. Each of the shift members is assigned a coupling member on the shift shaft. The coupling member has, on the one hand, a shift finger for engaging to a shift fork of the respective shift member. On the opposite side, the coupling elements each have an axial groove and a depression emanating from the axial groove. In a blocking state, the blocking elements each engage into the depressions and thus fix the coupling elements. As a result of the rotation of the shift shaft, assigned driving parts on the shift shaft press the blocking element to be released out of the depression, so that the blocking element is freely movable in the axial groove. At the same time, the driving part drives the selected coupling element during an axial movement, so that the shift member assigned to the coupling element is driven axially by the shift shaft.

In both embodiments, the coupling elements are complicated to produce and the transmission casing has to be prepared specially for the mounting of the blocking elements.

DE 199 01 056 A1 discloses a shift system similar to the second embodiment of DE 43 42 957 A1. In contrast to this, the axial grooves of the coupling elements are provided with latching depressions, so that the blocking elements not only serve for blocking, but also for latching in the respective shift positions.

Overall, the prior art, in each case, has at least one of the following disadvantages:
- A complicated mechanism for blocking;
- Friction between shift element and blocking element, in addition to the friction of the latching;
- The necessity to link together a positive connection with the shift rockers/forks into one plane;
- Casing bores for blocking elements;
- Casing bores for latching elements;
- Additional blocking/latching contours on the shift rockers/forks necessary;
- Depending on the system, blocking can take place only during the shift or selection movement;
- Gears which have been selected as a result of the action of external forces (for example, during transport) and are not selected by the shift shaft can no longer be shifted out.

SUMMARY OF THE INVENTION

The object of the present invention is, therefore, to specify an improved shift device for an inline transmission.

In the shift device for an inline transmission, mentioned at the outset, this object is achieved in that the blocking elements each act between an assigned shift member and a blocking member fixedly connected to the shift shaft.

By means of the blocking members connected fixedly to the shift shaft, the blocking device can be actuated via the existing shift shaft. This results in a simple design with few parts and with low moved masses. Furthermore, the design is equally suitable both for shift forks and for shift rockers. Moreover, in general terms, blocking can take place either by means of shift movement or by means of the selection movement.

In this case, it is particularly preferred if a shift finger and an assigned blocking member are formed in each case by an individual coupling member secured to the shift shaft.

In this embodiment, the number of parts is reduced even further, and a structurally simple set-up is obtained.

At the same time, it is preferred if the blocking members each extend from the shift shaft in the direction opposite to the assigned shift finger.

As a result, on the one hand, the shift shaft is balanced more effectively. On the other hand, the space present in the transmission is utilized optimally, particularly when the shift shaft is arranged centrally above the shift members.

According to a further preferred embodiment, the blocking elements are mounted on a carrier rail secured to a casing of the transmission so as to be movable in a direction transverse to the extent of the shift shaft.

It is thereby possible to mount the blocking elements, together with the carrier rail, as a preassembled unit in the transmission. The measures for mounting the carrier rail on the casing are markedly less complicated than a mounting of individual blocking elements directly on the transmission casing.

In this case, it is particularly preferred if the blocking elements are mounted, prestressed elastically, on a carrier rail.

As a result, on the one hand, a defined position of the blocking elements is achieved. On the other hand, elastic prestress may be utilized to set up a latching function for the individual shift positions (as a rule, three positions, to be precise neutral, shift position of first shift clutch of a shift-clutch unit and shift position of a second shift clutch of the shift-clutch unit).

In a refinement which is particularly beneficial in structural terms, the blocking elements each are connected to a spring, the springs of the blocking elements each engaging on the carrier rail.

As a result, the prestressing function is also integrated into the unit comprising carrier rail and blocking elements, so that the springs, too, can be built into the transmission within this preassemblable unit.

It is advantageous, overall, if the blocking elements each engage at their ends on a contour of the assigned shift member and on a contour of the assigned blocking member, respectively, the contours being coordinated with one another in such a way that the blocking elements positively fix axially those shift members which are not selected.

In this case, there may advantageously be avoided a direct contact between the blocking elements and the respective blocking members, by means of the elastic prestress of the blocking elements. The selection movements of the shift shaft can thereby be carried out with low friction.

It is particularly preferred, in this case, if the blocking elements are prestressed, in general, into a blocking groove of the shift member by means of the elastic prestress, in order at the same time to set up a latching function for the neutral position of the shift member. An axial movement of the shift member, starting from this position, is possible only when the contour of the blocking member allows this by virtue of the selected rotary position of the shift shaft, so that the blocking elements can escape into the direction of the blocking member.

Furthermore, it is advantageous, overall, if the shift members each have a fork portion with a first arm and with a second arm, in each case the first arm being capable of being positively coupled axially to the assigned shift finger, and the blocking elements each act between the second arm of the shift member and the blocking member.

An optimum utilization of space within the transmission is thereby achieved.

In this case, it is not necessary for the blocking elements to engage directly on the shift member. Instead, the shift member may also have provided on it an element connected fixedly to it. This may, in particular, be helpful when standardized shift members are used.

Furthermore, it goes without saying that the shift finger does not necessarily have to be designed as an individual finger. On the contrary, the shift finger may also be a fork. What is preferred is that an axial driving function can be achieved between shift finger and shift member.

Overall, at least one of the following features is implemented by means of the shift device according to the invention:

Actuation of the blocking device by the central shift shaft with the shift fingers;
Blocking in the shift-sleeve plane;
Preferable combination of blocking and latching function;
Preferably a unit prefabricated completely;
Preferably, a blocking element is pressed away from the shift shaft by means of a spring.

Overall, at least one of the following advantages is achieved by means of the shift device according to the invention:

Actuation of the blocking device via the existing shift shaft with the shift fingers;
Blocking can take place by means of the shift movement or the selection movement;
Equally suitable for shift forks and shift rockers;
Combination of a blocking and a latching function possible;
Simple design with few parts and with low moved masses
As a rule, no friction between shift shaft and blocking element (blocking bean).

It goes without saying that the features mentioned above and those yet to be explained below can be used not only in the combination specified in each case, but also in other combinations or alone, without departing from the scope of the present invention.

BRIEF DESCRIPTION OF THE DRAWINGS

Exemplary embodiments of the invention are illustrated in the drawing and are explained in more detail in the following description. In the drawing.

DETAILED DESCRIPTION OF THE PREFERRED EMBODIMENT

The shift device, described below, for manually actuated shift transmissions of in-line form of construction (including in-line transaxial) possesses a blocking device 8–16, 22 which prevents the situation where a plurality of gears can be shifted simultaneously. In a preferred refinement, this device 8–12, 22 serves at the same time for latching the shift rockers/forks 6 in their neutral position.

In the systems known hitherto, independent elements serve for blocking or for latching the shift rockers/forks 6. A plurality of orifices have to be made in the casing, various latching/blocking contours are necessary on the shift rocker/forks and friction occurs at a plurality of points.

The shift device according to the invention comprises a central shift shaft 2, a plurality of shift rockers or shift forks 6 (one per synchronizing unit) and in each case of one blocking element (blocking bean) 12 per shift rocker/fork 6. The blocking beans 12 are preferably introduced in a carrier rail 8 fixed with respect to the casing. Alternatively, the blocking elements 12 may also be mounted directly on the casing of the transmission.

The central shift shaft 2 carries one shift finger 20 per shift rocker/fork 6 for actuation. Depending on the rotary position of the shift shaft 2, these shift fingers 20 engage into corresponding gaps 34 on the shift rockers/forks 6.

The shift shaft 2 possesses preferably four shift fingers 20, that is to say can then actuate four rockers 6 or forks, as is necessary, for example, for a 6-gear transmission.

Figure 1:
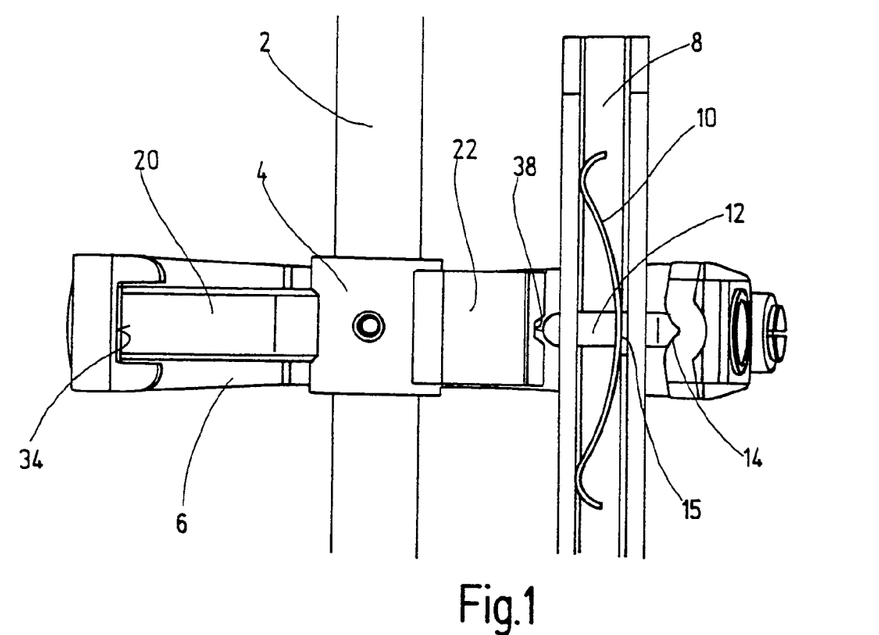
FIG. 1 shows the top view of a detail of a shift device according to the invention, the shift shaft having selected the shift member shown, but being located in an idling position.

The carrier rail 8 preferably lies parallel to the shift shaft 2 in the transmission casing. This carrier rail 8, for each shift rocker/fork 6, guides a blocking bean 12 in a bore and supports a leaf spring 10. This leaf spring 10 presses a respective blocking bean 12 away from the shift shaft 2 via a securing ring 15, into a contour 14 of the shift rocker/fork 6. Such a contour 14 must be present on all the shift members 6 (shift rockers/forks). The contour 14 may be provided directly on the respective shift member 6 or on an element secured to the latter. As the name already suggests, this latching/blocking contour 14 advantageously not only serves for the purpose of blocking. Since this contour 14 is present on each shift member 6, it is advantageously used at the same time as a latching contour. As can be seen in FIG. 1, the latching contour is approximately W-shaped in longitudinal section, that is to say three latching depressions for a middle position (FIG. 1) and for two shift positions for two shift clutches of a synchronizing assembly.

It goes without saying that, when a shift member 6 is used for a synchronizing assembly with only a single shift clutch, only two latching depressions (for a middle position and for the shift position) may also be provided.

Furthermore, it can be seen that the shift finger 20 extends from a coupling member 4 connected fixedly in terms of rotation and of displacement to the shift shaft. The coupling member 4 has extending from it onto the opposite side a blocking member 22 which is connected in one piece to the latter and is designed for cooperating with the blocking member 12.

In the present illustration, the coupling member 4 is described as an element with a shift finger 20 and with a blocking member 22. It goes without saying, however, that the coupling member 4 may also be designated, overall, as a shift finger with a first end 20 and with a second end 22.

FIG. 1 shows a detail of the shift arrangement, in which the shift shaft 2 is illustrated in the neutral position, in a perspective illustration from above. The shift shaft 2 with a shift finger 20 and an assigned shift rocker 6 with its latching/blocking contour 14 can be seen in the middle. On one side (on the left), it can be seen that the shift finger 20 is aligned with a shift gap 34 of the shift rocker 6. On the right lies the carrier rail 8 (parallel to the shift shaft 2) with a blocking bean 12, with a leaf spring 10 and with the associated securing ring 15. Here, the leaf spring 10 presses the blocking bean 12 into the latching/blocking contour 14 of the shift rocker 6, so that it is latched in its middle position via the spring force.

In this position, the shift shaft 2 can be rotated freely, without friction occurring between the blocking bean 12 and the shift shaft 2 together with the blocking member 22, since there is air between the blocking bean 12 and the blocking member 22. For this purpose, a V-shaped radial cutout 38 is preferably provided in the blocking member 22.

Figure 2:
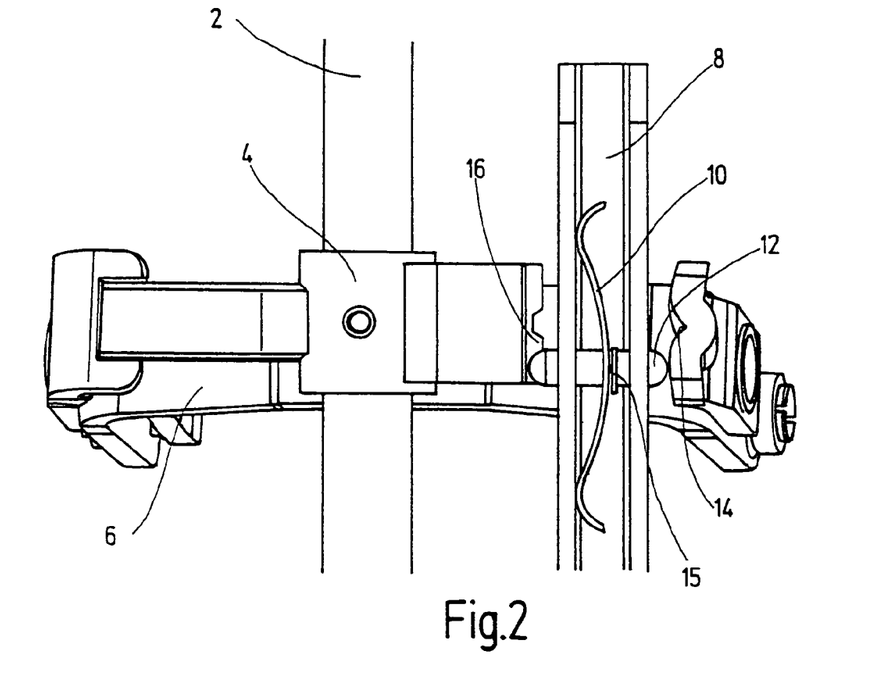
FIG. 2 shows a view corresponding to that of FIG. 1, the shift shaft being shown in a state of a first shift position of the assigned shift member.

In FIG. 2, the illustration of which corresponds to that of FIG. 1, a gear, which is actuated via the rocker 6 illustrated, has been shifted. The shift shaft 2 has been moved with its shift finger 20 in a longitudinal direction and the shift finger 20 has pivoted the shift rocker 6 in axial direction. As a result of this pivoting movement, the blocking bean 12 has been moved by the latching/blocking contour 14 on the shift rocker 6 counter to the leaf spring 15 in the direction of the shift shaft 2 or blocking member 22. An axial clearance 16 on the blocking member 22 allows the blocking bean 12 to execute this movement.

Figure 3:
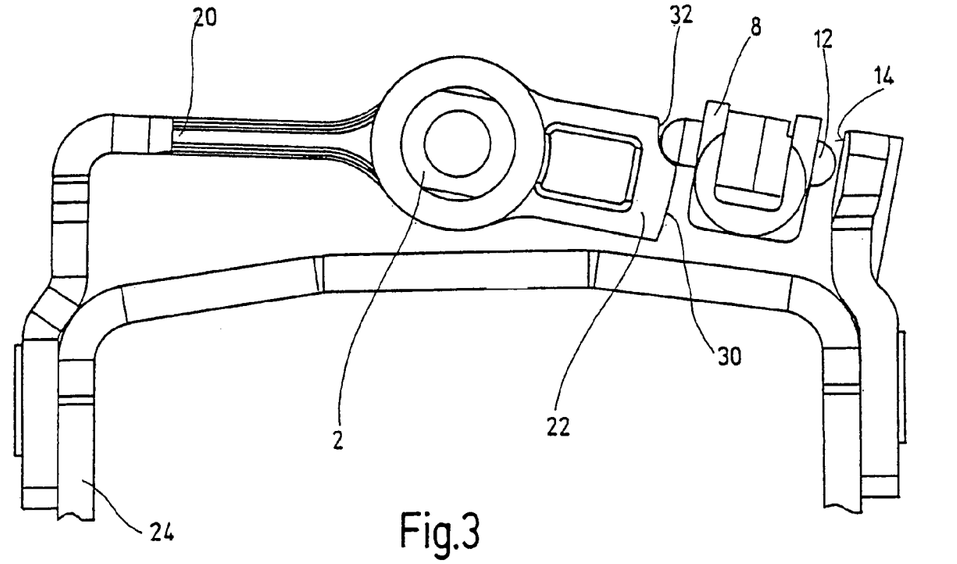
FIG. 3 shows a sectional view of that portion of the shift device according to the invention which is shown in FIG. 2.

FIG. 3 shows the shifted state in a diagrammatic sectional view from the side.

It goes without saying that, in the rotary position of the shift shaft 2, as shown in FIGS. 2 and 3, all the shift members 6 (shift forks or shift rockers) not shown are blocked, as is shown below in FIG. 4. This consequently prevents a situation where two gears are shifted in simultaneously.

Figure 4:
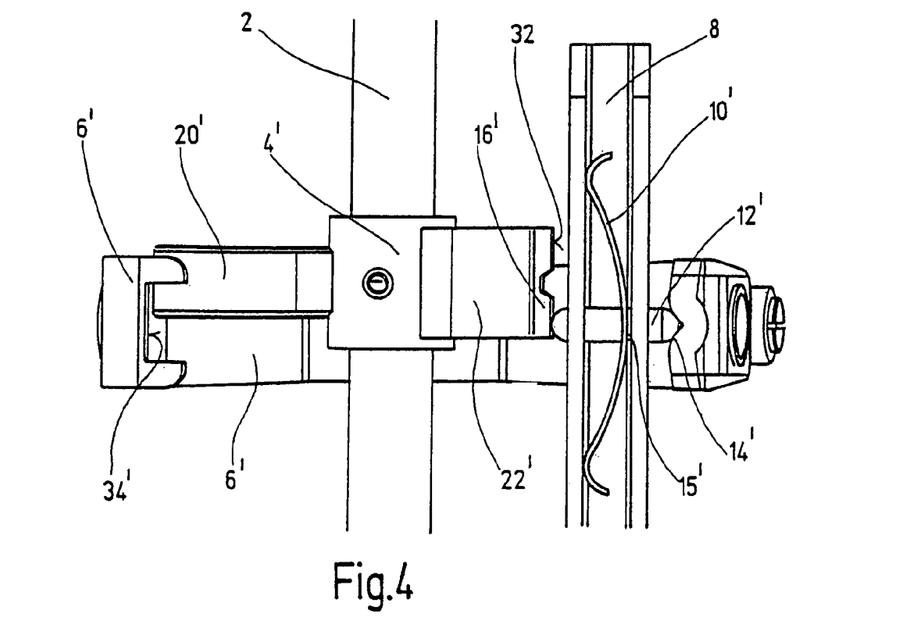
FIG. 4 shows a top view of another portion of the shift device, the same state of shift shaft being shown, but another shift member being illustrated, which in this case is blocked with respect to axial movements.

In FIG. 4, a gear has been selected which is actuated by a rocker other than the illustrated rocker 6'. This means that the shift shaft 2 has been rotated into another slot and is displaced longitudinally, as compared with FIGS. 2 and 3. In this state, the shift finger 20' illustrated does not engage into the gap 34' of the shift rocker 6' illustrated and cannot pivot the latter in axial direction. Furthermore, the leaf spring 15' presses a blocking bean 12' into the latching/blocking contour 14' of the shift rocker 6'. In this position, the axial clearance 16' in the radial contour 32' of the blocking member 22' no longer lies opposite the blocking bean 12', and the blocking member 22' prevents the blocking bean 12' from being capable of moving into the direction of the shift shaft 22.

Since the blocking bean 12' is blocked by the blocking member 22', the shift rocker 6' also cannot move, since, for this purpose, the blocking bean 12' would have to move out of the latching/blocking contour 14'. This prevents a gear other than the selected gear from being shifted in.

Figure 5:
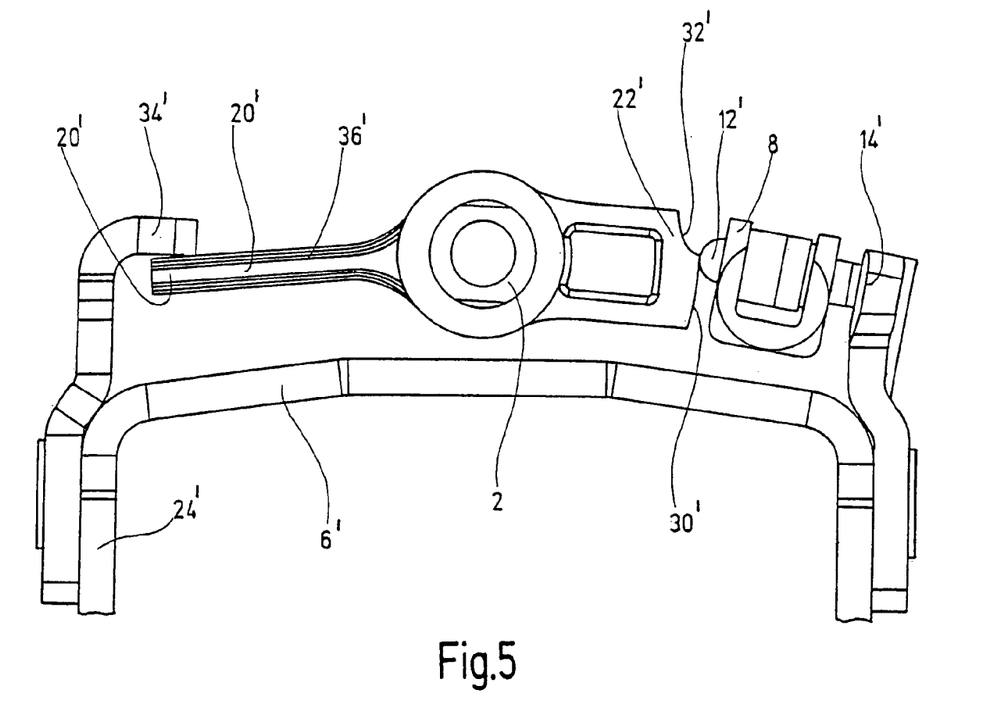
FIG. 5 shows a sectional view of that portion of the shift device which is shown in FIG. 4.

FIG. 5 shows a cross-sectional view of the arrangement shown in FIG. 4, in a section parallel to the shift-rocker plane. The shift shaft 2 is rotated into a position such that the shift finger 20' does not engage into the gap 34' in the shift member 6'. The shift member 6' shown is consequently not selected and, furthermore, is blocked with respect to an axial movement. The blocking element (blocking bean) 12' engages into the latching contour 14' of the shift member 6'. The blocking member 22' located opposite the gap 24' of the shift member 6' is provided with a radial contour 32'. In the blocking position shown, a blocking portion 30' of the radial contour 32' is located opposite the blocking element 12' in such a way that the latter cannot be deflected out of the latching contour 14' of the shift member 6' in contrast to an unblocked arrangement of the blocking element 12 and blocking portion 30 as in FIG. 3. Axial movement of the shift member 6' is impossible.

The arrangement comprising the carrier rail 8 and of the blocking elements (blocking beans) 12 mounted, prestressed elastically, on the latter can be preassembled as a unit and subsequently mounted, overall, in the transmission in one work step.

Alternatively to this, it may also be envisaged to design the carrier rail 8 as part of the transmission casing. In this case, the blocking elements 12 would be mounted individually on the respective casing part.

The elastic prestressing, implemented in the embodiment illustrated, of the blocking elements 12 by means of leaf springs 10 may be replaced by any type of elastic prestressing, for example by means of helical springs, rubber elements or elastomeric elements, etc.

The coupling member 4 together with the shift finger (driver) 20 is secured fixedly in terms of rotation to the shift shaft 2. The said coupling member is preferably of one-part design, but may also be of multi-part design.

In the embodiment illustrated, the radial V-cutout 38, which runs perpendicularly to the axial clearance 16, provides air (play) between blocking element 12 and blocking member 22 in all selection positions within the selection path (that is to say, in a neutral state of the transmission). Selection movements within the selection path can therefore be executed by hand, without any counterforce due to friction being generated by the blocking device. Play-free blocking takes place only by means of the shift movement, to be precise when the blocking portion 30 is drawn behind the blocking bean 12.

Alternatively, it is also possible to dispense with such play, for example in that no V-cutout is provided and the blocking bean 12 bears, essentially free of play, against the radial contour 32 of the blocking member 22. Blocking then takes place as a result of the selection movement.

The blocking device is suitable for any type of shift member 6, including shift rockers 6 and shift forks guided on shift rods.

An axial movement of the shift member 6 is understood, in the present case, to mean an axial displacement of a shift fork or the pivoting of a shift rocker 6.

What is claimed is:

1. A shift device for an inline transmission, comprising:
   a shift shaft which is rotated during selection movements and is offset axially during shift movements;
   a plurality of shift members each of which being mounted movably or pivotably in the axial direction, for the actuation of at least one assigned shift clutch;
   a plurality of shift fingers which are secured to the shift shaft and extend in each case towards one side, each shift finger being assigned to one of the shift members and being arranged in such a way that, in a defined rotary selection position of the shift shaft, the shift finger is coupled axially to its assigned shift member, in order to drive the shift member during an axial movement of the shift shaft; and
   a blocking device for preventing two or more gears of the transmission from being shifted simultaneously, the said blocking device having a plurality of individual blocking elements mounted fixedly with respect to the casing;
   wherein the blocking elements each act between an assigned shift member and a blocking member connected fixedly to the shift shaft;
   wherein the blocking elements are mounted on a carrier rail provided as an element separate from and secured to a casing of the transmission so as to be movable in a direction transverse to the extent of the shift shaft; and
   wherein the blocking elements are preassembled and prestressed elastically on the carrier rail so as to define a preassembled blocking device subassembly.

2. The shift device according to claim 1, wherein a shift finger and an assigned blocking member are formed in each case by an individual coupling member secured to the shift shaft.

3. The shift device according to claim 1, wherein the blocking members each extend from the shift shaft in the direction opposite to the assigned shift finger.

4. The shift device of claim 1, wherein the blocking elements each are connected to a spring, the springs engaging on the carrier rail.

5. The shift device of claim 1, wherein the blocking elements each engage at their ends on a contour of the assigned shift member and on a contour of the assigned blocking member, respectively, the contours are being matched to each other in such a way that the blocking elements positively fix axially those shift members which are not selected.

6. The shift device of claim 1, wherein the shift members each have a fork portion with a first arm and with a second arm, in that in each case the first arm can be positively coupled axially to the assigned shift finger, and in that the blocking elements each act between the second arm of the shift member and the blocking member.

7. A shift device for an inline transmission, comprising:
   a shift shaft which is rotated during selection movements and is offset axially during shift movements;
   a plurality of shift members each of which being mounted movably or pivotably in the axial direction, for the actuation of at least one assigned shift clutch;
   a plurality of shift fingers which are secured to the shift shaft and extend in each case towards one side, each shift finger being assigned to one of the shift members and being arranged in such a way that, in a defined rotary selection position of the shift shaft, the shift finger is coupled axially to its assigned shift member, in order to drive the shift member during an axial movement of the shift shaft; and
   a blocking device for preventing two or more gears of the transmission from being shifted simultaneously, the said blocking device having a plurality of individual blocking elements mounted fixedly with respect to the casing;
   wherein the blocking elements each act between an assigned shift member and a blocking member connected fixedly to the shift shaft; and
   wherein the shift members each comprise a latching contour which is approximately W-shaped in longitudinal section and comprises three latching depressions for a middle position and two shift positions for two shift clutches of a synchronizing assembly, wherein the blocking elements are pressed elastically into the latching contour.

8. The shift device of claim 7, wherein a shift finger and an assigned blocking member are formed in each case by an individual coupling member secured to the shift shaft.

9. The shift device of claim 7, wherein the blocking members each extend from the shift shaft in the direction opposite to the assigned shift finger.

10. The shift device of claim 7, wherein the blocking elements are mounted on a carrier rail secured to a casing of the transmission so as to be movable in a direction transverse to the extent of the shift shaft.

11. The shift device of claim 10, wherein the blocking elements are mounted, prestressed elastically, on the carrier rail.

12. The shift device of claim 11, wherein the blocking elements each are connected to a spring, the springs engaging on the carrier rail.

13. The shift device of claim 7, wherein the blocking elements each engage at their ends on a contour of the assigned shift member and on a contour of the assigned blocking member, respectively, the contours are being matched to each other in such a way that the blocking elements positively fix axially those shift members which are not selected.

14. The shift device of claim 7, wherein the shift members each have a fork portion with a first arm and with a second arm, in that in each case the first arm can be positively coupled axially to the assigned shift finger, and in that the blocking elements each act between the second arm of the shift member and the blocking member.

* * * * *

UNITED STATES PATENT AND TRADEMARK OFFICE
CERTIFICATE OF CORRECTION

PATENT NO.       : 7,089,821 B2
APPLICATION NO.  : 10/837523
DATED            : August 15, 2006
INVENTOR(S)      : Schaefer et al.

It is certified that error appears in the above-identified patent and that said Letters Patent is hereby corrected as shown below:

<u>TITLE PAGE</u>

Item (56), References Cited, line 2, delete "3,572,187" and insert --3,572,167--

<u>DRAWINGS</u>

Replace drawing sheet 2 of 3 with the attached sheet containing amendment to Fig. 4.

Signed and Sealed this

Sixth Day of March, 2007

JON W. DUDAS
*Director of the United States Patent and Trademark Office*

Fig.3

Fig.4